United States Patent Office 3,190,928
Patented June 22, 1965

3,190,928
PREPARATION OF TETRAALKYLCYCLO-
BUTANEDIOLS
Edward U. Elam and Robert H. Hasek, Kingsport, Tenn.,
assignors to Eastman Kodak Company, Rochester,
N.Y., a corporation of New Jersey
No Drawing. Filed Sept. 27, 1961, Ser. No. 141,037
11 Claims. (Cl. 260—617)

This application is a continuation-in-part application of our copending application, U.S. Serial No. 56,687, filed September 19, 1960, now abandoned.

This invention relates to the hydrogenation of cyclic diones to cyclic diols, and more specifically, to the hydrogenation of 2,2,4,4-tetraalkyl-1,3-cyclobutanediones to the corresponding 2,2,4,4-tetraalkyl-1,3-cyclobutanediols.

In U.S. Patent No. 2,936,324 dated May 10, 1960 we described the hydrogenation of 2,2,4,4-tetraalkyl-1,3-cyclobutanediones to 2,2,4,4-tetraalkyl-1,3-cyclobutanediols in the presence of ruthenium catalysts. The use of ruthenium catalysts results in very high yields. In addition, ruthenium catalysts can be employed effectively in a wide variety of solvent media. However, ruthenium is expensive and is rather easily poisoned or rendered inactive. Also, it is difficult to recover ruthenium from spent catalyst materials for reuse.

The only other method reported in the literature for hydrogenating 2,2,4,4-tetraalkyl-1,3-cyclobutanediones to 2,2,4,4-tetraalkyl-1,3-cyclobutanediols is the use of Raney nickel as the catalyst in a methanolic reaction medium. However, this reaction produces erratic results and often times substantially no yield of diol results, the reaction product being contaminated by such by-products as acyclic ketones and oily by-products.

The subject highly substituted 1,3-diketone readily undergoes cleavage during hydrogenation and is thus a difficult material to hydrogenate to the corresponding diol. Thus, it is highly desirable to have a new and commercially feasible process for hydrogenating 2,2,4,4-tetraalkyl-1,3-cyclobutanediones to 2,2,4,4-tetraalkyl-1,3-cyclobutanediols.

It is an object of this invention to provide an improved method for hydrogenating 2,2,4,4-tetraalkyl-1,3-cyclobutanediones to 2,2,4,4-tetraalkyl-1,3-cyclobutanediols.

It is another object of this invention to reduce 2,2,4,4-tetraalkyl-1,3-cyclobutanediones to 2,2,4,4-tetraalkyl-1,3-cyclobutanediols by an improved process which is characterized by the formation of substantially no reaction by-products.

It is still another object of this invention to hydrogenate 2,2,4,4-tetramethyl-1,3-cyclobutanedione to the corresponding diol in high yields wherein a novel catalyst-solvent combination is utilized.

It is likewise an object of this invention to provide a novel process for preparing 2,2,4,4-tetraalkyl-1,3-cyclobutanediols having a high concentration of the trans isomer.

These and other objects will be apparent from the description and claims below.

The hydrogenation reaction of the invention is effected by hydrogenating 2,2,4,4-tetraalkyl-1,3-cyclobutanediones to 2,2,4,4-tetraalkyl-1,3-cyclobutanediols in the presence of nickel-containing catalysts in certain inert solvent media. The reaction of the invention can be represented by the following equation:

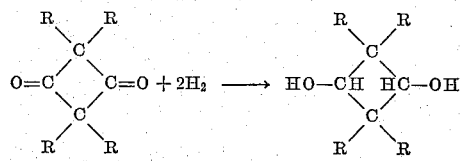

wherein R is an alkyl radical, and preferably a lower alkyl radical having 1 to 8 carbon atoms. The dione, 2,2,4,4-tetramethyl-1,3-cyclobutanedione, is hydrogenated to the corresponding diol in particularly high yields in accordance with the present process. The alkyl radicals need not be the same on the 2,2,4,4-tetraalkyl-1,3-cyclobutanediones reduced in accordance with the invention, such compounds as 2,4-dimethyl-2,4-diethyl-1,3-cyclobutanedione and the like are included in the invention. Other 2,2,4,4-tetraalkyl-1,3-cyclobutanediones that are suitably reduced to the corresponding diols include such 2,2,4,4-tetraalkyldiones as the 2,2,4,4-tetraethyldione, the 2,2,4,4-tetra-n-propyldione, the 2,2,4,4-tetra-n-butyldione, the 2,2,4,4-tetra-n-amyldione, the 2,2,4,4-tetra-n-hexyldione, the 2,2,4,4-tetra-n-heptyldione, the 2,2,4,4-tetra-n-octyldione, the 2,2-dimethyl-4,4-diethyldione, the 2-ethyl-2,4,4-trimethyldione, the 2,4-dimethyl-2,4-di-n-propyldione, the 2,4-n-dibutyl-2,4-diethyldione, the 2,4-dimethyl-2,4-diisobutyldione, the 2,4-diethyl-2,4-diisoamyldione, the 2,4-di-n-amyl-2,4-di-n-propyldione, etc.

The nickel-containing catalysts employed in the present process can be present initially either as a metal or as a compound which is readily reduced to the metal or elemental form under the conditions of the reaction. Hence, the catalyst of the reaction is nickel in its elemental form. A suitable nickel-containing catalyst is the well-known Raney nickel catalyst. The actual physical state or form of the catalyst can be widely varied as long as it presents a large surface to the reaction medium. Suitable catalysts are, for example: colloidal nickel; powdered nickel; elemental nickel supported on powedered activated carbon, alumina, silica, kieselguhr, refractory oxides, etc.; or elemental nickel supported on pellets, granules or extrusions. In general, a powdered catalyst would be used if the reaction were carried out batch-wise in an autoclave, and pelleted or granule catalysts would be used for continuous operations in a tower or reactor packed with catalyst. The amount of catalyst material can be widely varied in accordance with usual practice. In a batch-wise operation the catalyst is usually varied from about .1% to 10% by weight of nickel based on the dione reduced. In a continuous operation in a tower packed with a supported catalyst the ratio of catalyst to the dione reactant, of course, is very much higher.

With regard to suitable reaction conditions under which the subject process can be effected, temperatures from about 20° C. up to about 200° C. are more generally used, with temperatures of 100° C. to 175° C. being preferred. However, the reaction temperature can be varied over a wide range in accordance with usual hydrogenation practice, lower reaction temperatures tending to decrease the reaction rate. Reaction temperatures of 20° C. to 150° C., and preferably about 100° C. to about 150° C., are utilized to prepare diols having the highest concentrations of the trans isomer as described hereinafter. Cis and trans isomeric configurations occur in the subject diols around the carbon atoms on the cyclobutane ring on which the hydroxyl groups are attached. The hydrogen pressure used in the present reaction can also be varied over a wide range, elevated pressures up to about 500 atmospheres being suitable, generally 50 to 500 atmospheres, with pressures from about 50 to 200 atmospheres being preferred. The subject hydrogenation is carried out until substantially all of the dione in the reaction mixture is reduced, this point being determined when no more hydrogen is consumed in the reaction.

A novel feature of the present process is the use of certain substantially inert organic solvents as the present reaction medium. Suitable solvents that can be employed in the present process are:

(A) saturated hydrocarbons having 6 to 10 carbon atoms, including aliphatic and cyclic hydrocarbons;

(B) esters having the formula

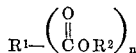

wherein $R^1$ and $R^2$ are saturated hydrocarbon radicals and more generally $R^1$ is an alkyl or alkylene radical having 1 to 4 carbon atoms and $R^2$ is an alkyl radical having 1 to 8 carbon atoms, and wherein $n$ is an integer of 1 or 2; and, (C) saturated alcohols having the formula $R^3-(OH)_n$ wherein $R^3$ is a saturated hydrocarbon radical having 3 to 12 carbon atoms, including aliphatic and cyclic hydrocarbon radicals, and wherein $n$ is an integer of 1 or 2. Illustrative reaction media that can be suitably employed in the present process include cyclohexane, n-hexane, n-octane, n-decane, ethyl acetate, ispropyl acetate, ethyl butyrate, dimethyl adipate, ethylhexyl acetate, isopropyl alcohol, tertiary-butyl alcohol, ethylhexanol, 4-methyl-2-pentanol, the diols resulting from the present process, 1,4-cyclohexanedimethanol, 2-methoxyethyl acetate, petroleum ether, methylcyclohexane, ligroin and the like.

Methanol, which has classically been employed as a solvent medium for the hydrogenation of 2,2,4,4-tetraalkyl-1,3-cyclobutanediones to 2,2,4,4-tetraalkyl-1,3-cyclobutanediols with Raney nickel catalysts results in poor yields. Likewise, poor results are obtained with halogenated solvents, sulphur-containing solvents, phosphorus-containing solvents, solvents consisting of esters of inorganic acids, as well as solvents containing nitro groups, nitrile groups, aldehyde groups and ketone groups and other well-known and often times employed solvents for organic reactions.

The product of the subject reaction is characterized as being of high purity and generally requires a minimum of "work-up" or purifying, although conventional purification methods can be employed on the reaction product of the invention. Such purification methods as distillation and crystallization can be suitably employed. The catalyst can be readily separated from the reaction product by filtration and utilized again. Yields of 90% to 95% or higher are commonly obtained in the subject process.

The subject 2,2,4,4-tetraalkyl-1,3-cyclobutanediols are useful in that esters and polyesters prepared therefrom have many useful properties. Certain esters thereof have utility as synthetic lubricants and as plasticizers for cellulosic plastics, polyvinyl chloride resins and other plastic compositions. Such esters are characterized as having high thermal stability and resistance to hydrolytic degradation.

The use of nickel catalysts with certain solvents in the present process not only results in high conversion yields of dione to diol, but also a high proportion of the diol product is prepared in the trans isomeric form when reaction temperatures up to 150° C. are utilized. Such high proportions of the trans isomer do not result when the subject hydrogenation reaction is effected in the presence of a ruthenium catalyst as described in U.S. Patent No. 2,936,324 dated May 10, 1960. Trans isomers are useful in preparing high melting polymers such as for example that result on the reaction of diphenyl terephthalate and 2,2,4,4 - tetramethyl-1,3-cyclobutanediol. Trans isomers can be readily separated from mixtures of cis and trans isomers by the method described by Martin and Elam in copending U.S. Serial No. 79,492, filed December 30, 1960.

The invention is illustrated by the following examples of preferred embodiments thereof.

EXAMPLE 1

A solution of 500 g. of 2,2,4,4-tetramethyl-1,3-cyclobutanedione in 2000 ml. of isopropyl acetate was placed in a 1 gal. stainless steel rocking autoclave and hydrogenated over 25 g. of a nickel catalyst containing about 60% by weight of nickel supported on kieselguhr in powder form of which 90% will pass a 325 mesh screen ("Girdler G-49" catalyst, Chemetron Corp.), at 130° C. and 750 p.s.i. hydrogen pressure. After about three hours, the reduction was complete and the autoclave was cooled to room temperature and the product removed. The product was heated to dissolve precipitated diol, filtered from the catalyst, and the filtrate evaporated to dryness to give 473 g. (92% yield) of 2,2,4,4-tetramethyl-1,3-cyclobutanediol (about 42% cis and 58% trans isomers) which melted from 128° to approximately 150° C. The recovered catalyst can be utilized again in other related hydrogenation reactions.

EXAMPLES 2 TO 5

The catalyst concentration and reaction pressure can be varied considerably without greatly affecting the yield of diol. Thirty-five grams of 2,2,4,4-tetramethyl-1,3-cyclobutanedione and 150 ml. of isobutyl acetate were placed in a 300 ml. stainless steel rocking autoclave together with the nickel catalyst described in Example 1 and hydrogenated for six hours at 130° C. Methanol was added to the product to dissolve the diol completely, and the solution was filtered from catalyst and the filtrate analyzed by gas chromatography. This procedure was repeated under various pressures and with various catalyst concentrations. Yields obtained under various reaction conditions are summarized by the data set out in the table below.

Table A

| Example | Catalyst Wt., Grams | Hydrogen Pressure, p.s.i. | Diol [1] Yield, Percent |
| --- | --- | --- | --- |
| 2 | 2 | 500 | 98 |
| 3 | 5 | 500 | 95 |
| 4 | 2 | 1,000 | 98 |
| 5 | 2 | 2,000 | 98 |

[1] 2,2,4,4-tetramethyl-1,3-cyclobutanediol (about 42% cis and 58% trans isomers).

EXAMPLE 6

A mixture of 400 g. of 2,2,4,4-tetramethylcyclobutanedione, 2000 ml. of cyclohexane, and 25 g. of alcohol-washed Raney nickel was placed in a 4560 ml. stainless steel rocking autoclave. The autoclave was purged with hydrogen, then charged to 1500 p.s.i. with hydrogen and heated to 150° C. Sufficient hydrogen was then charged to maintain the pressure at 3000 p.s.i. until absorption stopped. The reaction required eighteen hours for completion. The product, which contained a large amount of solid, was removed from the autoclave and filtered. The crystalline 2,2,4,4-tetramethyl-1,3-cyclobutanediol was dissolved in hot methanol and filtered to remove catalyst. This filtrate was combined with the original cyclohexane filtrate and evaporated to dryness. The yield of crude 2,2,4,4-tetramethyl-1,3-cyclobutanediol product melting at 130–133° C., was 388 g. (94% yield, about 50% cis and 50% trans isomers). The infrared spectrum of this material indicated the presence of only a trace of carbonyl-containing impurity.

EXAMPLE 7

2,2,4,4-tetramethyl-1,3-cyclobutanedione was hydrogenated in a continuous hydrogenation apparatus comprised of 880 ml. and 700 ml. tubular autoclaves connected in series and packed with a nickel catalyst containing about 60% by weight of nickel supported on kieselguhr in the form of ⅛ inch pellets ("Ni–0104" catalyst, Harshaw Chemical Company). Seven hundred twenty pounds of the dione was pumped over the catalyst as a 24% solution in isobutyl acetate, at feed rates varying from 20 to 110 ml. of solution per minute, at reactor temperatures which varied from 125° C. to 168° C. The hydrogen pressure was 2000 p.s.i. The 2,2,4,4-tetramethyl-1,3-cyclobutanediol produced crystallized from the effluent from the reactor on cooling, giving 544 pounds (76% yield) of "first crop crystals." Cooling the mother liquors gave an additional 107 pounds of second crop material which was also of high purity. The total yield of 2,2,4,4-tetramethylcyclobutanediol recovered was 88%.

EXAMPLE 8

Example 7 was repeated at a 500 p.s.i. pressure. Analysis of the product by gas chromatography indicated that the yield of 2,2,4,4-tetramethylcyclobutanediol was about 84%.

EXAMPLE 9

Five hundred grams of 2,4-diethyl-2,4-dibutylcyclobutane-1,3,-dione were hydrogenated under the conditions of Example 1. The yield of 2,4-diethyl-2,4-dibutyl-1,3-cyclobutanediol was 90%.

EXAMPLE 10

A mixture of 100 g. of 2,2,4,4-tetramethyl-1,3-cyclobutanedione and 20 g. of the nickel catalyst used in Example 1 was placed in a 300 ml. stainless steel rocking autoclave and heated at 150° C. under 2000 p.s.i. pressure of hydrogen. When reduction was complete, as indicated by no further absorption of hydrogen, the autoclave was cooled and vented. The solid product was dissolved in methanol and the solution was filtered to remove the hydrogenation catalyst. Evaporation of the methanol gave crystalline 2,2,4,4-tetramethyl-1,3-cyclobutanediol recovered in 92% of the theoretical yield (about 50% cis and 50% trans isomer). Here the final product served as the reaction medium.

EXAMPLE 11

A mixture of 198 g. of 2,4-diethyl-2,4-dimethyl-1,3-cyclobutanedione, 300 ml. of ethyl acetate, and 20 g. of the nickel catalyst used in Example 1 was hydrogenated at 130° C. and 3000 p.s.i. for 4 hours in a stainless steel rocking autoclave. After being cooled and removed from the autoclave, the reaction mixture was filtered to remove the catalyst. The filtrate was evaporated on the steam bath to give a residue of 200 g. (98.5%) of crude 2,4-diethyl-2,4-dimethyl-1,3-cyclobutanediol. This material was distilled through an 18 inch packed column to give 173 g. (84.5%) of 2,4-diethyl-2,4-dimethyl-1,3-cyclobutanedioyl, B.P. 114–117° C. (3.6 mm.) This material solidified to a waxey solid on cooling.

EXAMPLE 12

A mixture of 140 g. (1 mole) of 2,2,4,4-tetramethyl-1,3-cyclobutanedione, 300 ml. of isopropyl alcohol, and 25 g. of the nickel catalyst used in Example 1 was hydrogenated 130° C., 3000 p.s.i. in a stainless steel rocking autoclave. The product was filtered from catalyst and the solvent evaporated to give 130 g. (90% yield, about 40% cis and 60% trans isomers) 2,2,4,4-tetramethyl-1,3-cyclobutanediol.

EXAMPLE 13

Example 12 was repeated with tertiary-butyl alcohol as the solvent. The yield of 2,2,4,4-tetramethyl-1,3-cyclobutanediol was 92% (about 40% cis and 60% trans isomers).

EXAMPLE 14

The continuous hydrogenation apparatus described in Example 7 was modified to recycle the product from the first 880 ml. hydrogenation zone back to the reactor inlet, where it diluted an incoming feed of molten tetramethyl-1,3-cyclobutanedione. The dione feed was thus reduced in concentration to a 20 to 30% solution in the reduction product, and the exothermic hydrogenation process was more easily controlled by suitable heat exchange equipment in the recycle system. The overflow from the recycle reactor was passed through the second (700 ml.) reactor to finish the hydrogenation, and the crude diol was purified by distillation. A total of 410 lbs. of the dione was processed, at feed rates of 10 to 50 g./min. Temperatures were held above 160° C., but under 180° C., while pressures were varied from 500 to 2500 p.s.i. Accountability of a batch of feed material was difficult, but hourly input-output balances during continuous operation showed substantially quantitative conversions of the dione to the corresponding 2,2,4,4-tetramethyl-1,3cyclobutanediol. The diol product contained about 50% cis and 50% trans isomers.

As noted hereinabove, the classical method for hydrogenating 2,2,4,4-tetraalkyl-1,3-cyclobutanediones to 2,2,4,4-tetraalkyl-1,3-cyclobutanediols was to employ Raney nickel in a methanol reaction medium. However, this reaction results in the formation of substantial amounts of various undesired by-products. Example 15 below illustrates the hydrogenation of 2,2,4,4-tetramethyl-1,3-cyclobutanedione over Raney nickel in a methanol solvent medium.

EXAMPLE 15

A mixture of 285 g. of 2,2,4,4-tetramethyl-1,3-cyclobutanedione, 400 ml. of methanol, and 20 g. of Raney nickel was hydrogenated in a 1-liter stainless steel rocking autoclave at 150° C. under 1500 p.s.i. pressure of hydrogen. Absorption of hydrogen was rapid at first, but soon became very slow. After 18 hrs. the reaction mixture was removed and filtered. 50 g. of Raney nickel was added to the filtrate, and the mixture was hydrogenated under the same conditions for 5 hrs. The product was filtered to remove catalyst and distilled at atmospheric pressure to remove methanol. The residue showed no tendency to crystallize when cooled. The distillation was resumed, and 77 g. of distillate was collected which boiled in the range of 104–160° C., refused to crystallize, and gave a voluminous precipitate with 2,4-dinitrophenylhydrazine reagent. This fraction contained a considerable amount of methyl 2,2,4-trimethyl-3-oxovalerate, formed by reaction of methanol with the tetramethyl-1,3-cyclobutanedione. On further distillation, excessive decomposition of the residue was noted, and a white solid with the appearance and odor of paraformaldehyde coated the inside of the condenser. This behavior was due to decomposition of another by-product, 1-hydroxy-2,2,4-trimethyl-3-pentanone, to formaldehyde and diisopropyl ketone. The distillation was completed under reduced pressure, giving an additional 91 g. of liquid by-products boiling from 56–80° C. (2 mm.) and 26.6 g. of residue, from which some tetramethylcyclobutanediol crystallized on cooling. The table set out in Example 6 of U.S. Patent No. 2,936,324 further describes the low yields of cyclic diol resulting in the present reaction when Raney nickel is used in a methanolic reaction medium.

Examples 16 and 17 below illustrate that the proportion of the trans isomer of the diol in the present reaction products can be varied by varying the reaction temperature.

EXAMPLE 16

2,2,4,4-tetramethyl-1,3-cyclobutanedione dissolved in 4-methyl-2-pentanol was hydrogenated at about 2000 p.s.i. in a continuous hydrogenation apparatus comprised of 800 ml. and 700 ml. tubular autoclaves connected in series and packed with a nickel catalyst containing about 60% by weight of nickel supported on kieselguhr in the form of 1/8 inch pellets ("Ni-0104" catalyst, Harshaw Chemical Company). Samples of 2,2,4,4-tetramethyl-1,3-cyclobutanediol product were collected at various reactor hotspot temperatures, the solvent removed by distillation, and the residual diol analyzed for percent cis-isomer by infrared absorption spectroscopy. The trans isomer was determined by difference. The results are tabulated in Table B below.

Table B

| Hydrogenation Temperature, °C. | Isomer Content of Diol Product | |
|---|---|---|
| | Percent Cis | Percent Trans |
| 128 | 34.5 | 65.5 |
| 130 | 34.6 | 65.4 |
| 136 | 35.5 | 64.5 |
| 139 | 38.8 | 61.2 |
| 152 | 47.1 | 52.9 |
| 172 | 51.0 | 49.0 |

EXAMPLE 17

Twenty-five gram portions of 2,2,4,4-tetramethyl-1,3-cyclobutanedione dissolved in 150 ml. of 4-methyl-2-pentanol were hydrogenated at about 2000 p.s.i. in a rocking autoclave over 10 g. of a nickel catalyst containing about 60% by weight of nickel on kieselguhr in powder form of which 90% will pass a 325 mesh screen ("Girdler G-49" catalyst, Chemetron Corp.) at varying temperatures as indicated below for six hours. The resulting diol product, 2,2,4,4-tetramethyl-1,3-cyclobutanediol, was then analyzed for cis and trans isomer content as described in Example 16. The proportions of cis and trans isomers resulting from hydrogenation temperatures of 100° C., 125° C. and 175° C. are summarized by the data set out in Table C below.

Table C

| Hydrogenation Temperature, °C. | Isomer Content of Diol Product | |
|---|---|---|
| | Percent Cis | Percent Trans |
| 100 | 36.4 | 63.6 |
| 125 | 40.0 | 60.0 |
| 175 | 52.2 | 47.8 |

EXAMPLE 18

For purposes of comparison, the hydrogenation reactions of Example 17 were repeated at 125° C. and 175° C. except that in lieu of the nickel catalyst a catalyst consisting of 5% ruthenium supported on powdered carbon was utilized. The results of the hydrogenation reactions are summarized by the data set out in Table D below.

Table D

| Hydrogenation Temperature, °C. | Isomer Content of Diol Product | |
|---|---|---|
| | Percent Cis | Percent Trans |
| 125 | 55.5 | 44.5 |
| 175 | 52.3 | 47.7 |

In the above examples the percent of cis isomer was analyzed for by infrared absorption spectroscopy and the trans isomer by difference. With respect to the cis and trans isomers of 2,2,4,4-tetramethyl-1,3-cyclobutanediol, we have referred to the isomer melting at 162–3° C. as the cis isomer and the isomer melting at 147–8° C. as the trans isomer.

The present invention thus provides a novel, high yielding, commercially desirable process for hydrogenating 2,2,4,4-tetraalkyl-1,3-cyclobutanediones to the corresponding diols. In addition, high proportions of the trans isomer of these diols can be prepared by controlling the present hydrogenation reaction temperatures.

The invention has been described in detail with particular reference to preferred embodiments thereof, but it will be understood that variations and modifications can be effected within the spirit and scope of the invention as described hereinabove and as defined in the appended claims.

We claim:

1. The process for preparing cyclic diols which comprises hydrogenating 2,2,4,4-tetraalkyl-1,3-cyclobutanediones wherein the alkyl radicals have 1 to 8 carbon atoms, said hydrogenation being carried out at a temperature of 20° to 200° C. and at an elevated pressure up to about 500 atmospheres in the presence of a hydrogenation catalyst consisting essentially of elemental nickel in a solvent reaction medium consisting essentially of a substantially inert solvent medium selected from the group consisting of:

(A) saturated hydrocarbons having 6 to 10 carbon atoms;

(B) esters having the formula

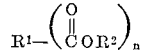

wherein $R^1$ is a saturated hydrocarbon radical having 1 to 4 carbon atoms, $R^2$ is a saturated hydrocarbon radical having 1 to 8 carbon atoms and $n$ is an integer of 1 to 2; and (C) an alcohol having the formula $R^3(OH)_n$ wherein $R^3$ is a saturated hydrocarbon having 3 to 12 carbon atoms and $n$ is an integer of 1 to 2.

2. The process for preparing cyclic diols which comprises hydrogenating 2,2,4,4-tetraalkyl-1,3-cyclobutanediones wherein the alkyl radicals have 1 to 8 carbon atoms, said hydrogenation being carried out at a temperature of 20° to 200° C. and at an elevated pressure up to about 500 atmospheres in the presence of a hydrogenation catalyst consisting essentially of elemental nickel in a solvent medium consisting essentially of substantially inert saturated hydrocarbons having 6 to 10 carbon atoms.

3. The process for preparing cyclic diols which comprises hydrogenating 2,2,4,4-tetraalkyl-1,3-cyclobutanediones wherein the alkyl radicals have 1 to 8 carbon atoms, said hydrogenation being carried out at a temperature of 20° to 200° C. and at an elevated pressure up to about 500 atmospheres in the presence of a hydrogenation catalyst consisting essentially of elemental nickel in a solvent medium consisting essentially of an ester having the formula

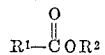

wherein $R^1$ is an alkyl radical having 1 to 4 carbon atoms and $R^2$ is an alkyl radical having 1 to 8 carbon atoms.

4. The process for preparing cyclic diols which comprises hydrogenating 2,2,4,4-tetraalkyl-1,3-cyclobutanediones wherein the alkyl radicals have 1 to 8 carbon atoms, said hydrogenation being carried out at a temperature of 20° to 200° C. and at an elevated pressure up to about 500 atmospheres in the presence of a hydrogenation catalyst consisting essentially of elemental nickel in a solvent medium consisting essentially of a saturated alcohol having the formula $R^3(OH)_n$ wherein $R^3$ is a saturated hydrocarbon having 3 to 12 carbon atoms and $n$ is an integer of 1 to 2.

5. The process for hydrogenating 2,2,4,4-tetramethyl-1,3-cyclobutanedione to 2,2,4,4-tetramethyl-1,3-cyclobutanediol which comprises affecting said hydrogenation at a temperature of 100° C. to 175° C. and at a pressure of 50 to 200 atmospheres in the presence of a hydrogenation catalyst consisting essentially of elemental nickel in a reaction solvent medium consisting essentially of isopropyl acetate.

6. The process for hydrogenating 2,2,4,4-tetramethyl-1,3-cyclobutanedione to 2,2,4,4-tetramethyl-1,3-cyclobutanediol which comprises affecting said hydrogenation at a temperature of 100° C. to 175° C. and at a pressure of 50 to 200 atmospheres in the presence of a hydrogenation catalyst consisting essentially of elemental nickel in a reaction solvent medium consisting essentially of isobutyl acetate.

7. The process for hydrogenating 2,2,4,4-tetramethyl-1,3-cyclobutanedione to 2,2,4,4-tetramethyl-1,3-cyclobutanediol which comprises affecting said hydrogenation at a temperature of 100° C. to 175° C. and at a pressure of 50 to 200 atmospheres in the presence of a hydrogenation catalyst consisting essentially of nickel in a reaction solvent medium consisting essentially of cyclohexane.

8. The process for hydrogenating 2,2,4,4-tetramethyl-1,3-cyclobutanedione to 2,2,4,4-tetramethyl-1,3-cyclobutanediol which comprises affecting said hydrogenation at a temperature of 100° C. to 175° C. and at a pressure of 50 to 200 atmospheres in the presence of a hydrogenation catalyst consisting essentially of elemental nickel in a reaction solvent medium consisting essentially of 2,2,4,4-tetramethyl-1,3-cyclobutanediol.

9. The process for hydrogenating 2,2,4,4-tetramethyl-1,3-cyclobutanedione to 2,2,4,4-tetramethyl-1,3-cyclobutanediol which comprises affecting said hydrogenation at a temperature of 100° C. to 175° C. and at a pressure of 50 to 200 atmospheres in the presence of a hydrogenation catalyst consisting essentially of elemental nickel in a reaction solvent medium consisting essentially of ethyl acetate.

10. The process according to claim 1 wherein the hydrogenation catalyst is elemental nickel supported on kieselguhr.

11. The process according to claim 1 wherein the hydrogenation catalyst is Raney nickel.

References Cited by the Examiner
UNITED STATES PATENTS

| | | | |
|---|---|---|---|
| 2,752,399 | 6/56 | Grimme et al. | 260—635 |
| 2,936,324 | 5/60 | Hasek et al. | 260—617 |
| 3,000,906 | 9/61 | Hasek et al. | 260—617 |

OTHER REFERENCES

Miller: "The Structure of Some Derivatives of Dimethylketene," June 1937, page 47, Cornell University, 260–6.

LEON ZITVER, *Primary Examiner.*

CHARLES B. PARKER, *Examiner.*